United States Patent [19]

Steinberger et al.

[11] Patent Number: 4,781,390
[45] Date of Patent: Nov. 1, 1988

[54] APPARATUS FOR THE ADJUSTMENT OF THE TENSION IN A ROTATING GRIPPING DEVICE OF A MACHINE TOOL

[75] Inventors: Josef Steinberger, Düsseldorf; Bert Bongartz, deceased, late of Düsseldorf, both of Fed. Rep. of Germany, by Sigrid Bongartz, heiress

[73] Assignee: Paul Forkardt GmbH & Co. KG, Düsseldorf, Fed. Rep. of Germany

[21] Appl. No.: 900,835

[22] Filed: Aug. 27, 1986

[30] Foreign Application Priority Data

Aug. 27, 1985 [EP] European Pat. Off. ........ 85110723.5

[51] Int. Cl.⁴ ............................................. B23B 31/24
[52] U.S. Cl. .................................... 279/4; 82/DIG. 6
[58] Field of Search ............. 279/1 R, 4, 1 ME, 23 R, 279/23 A; 408/20, 124, 139, 238, 239 R, 239 A, 240; 409/231, 232, 233, 234; 82/DIG. 6

[56] References Cited

U.S. PATENT DOCUMENTS

| 4,414,871 | 11/1983 | Trout | 279/4 X |
| 4,443,021 | 4/1984 | Buchholz et al. | 279/4 |
| 4,502,704 | 3/1985 | Jackson | 279/111 |
| 4,513,979 | 4/1985 | Silverman | 279/4 |
| 4,624,466 | 11/1986 | Steinberger | 279/121 |

FOREIGN PATENT DOCUMENTS 108857 5/1984 European Pat. Off. .
2150885 3/1973 Fed. Rep. of Germany .......... 279/4
2557470 7/1983 Fed. Rep. of Germany .
2547222 12/1984 Fed. Rep. of Germany .......... 279/4

Primary Examiner—Z. R. Bilinsky
Attorney, Agent, or Firm—Becker & Becker, Inc.

[57] ABSTRACT

An apparatus for the adjustment of the tension in rotating gripping devices, which are operable with variable power outputs and follow (hysteresis) distinct tension-characteristics for build-up and withdrawal. In order to make possible a stabilization of the tension which is independent from the rotational speed, a desired value for the tension and an internal tolerance allotment for an upper and a lower desired adjustment value are presupposed in a control apparatus. In the control apparatus a leading regulated quantity is produced digitally for the changing of power outputs. The leading regulated quantity is reduced when the desired value approaches a presupposed amount, so that the actual value in presupposed intervals lessens regularly through the regulated quantity reduction under the desired value and is again increased. By an increase of the actual value to one of the upper tolerance allotment presupposed values, the regulated quantity is lessened as a desired value to the reduction of the tension and overcoming of the hysteresis under allotments of the lower adjusted desired values, until the actual value has fallen to a value between the desired value and the presupposed desired value.

2 Claims, 3 Drawing Sheets

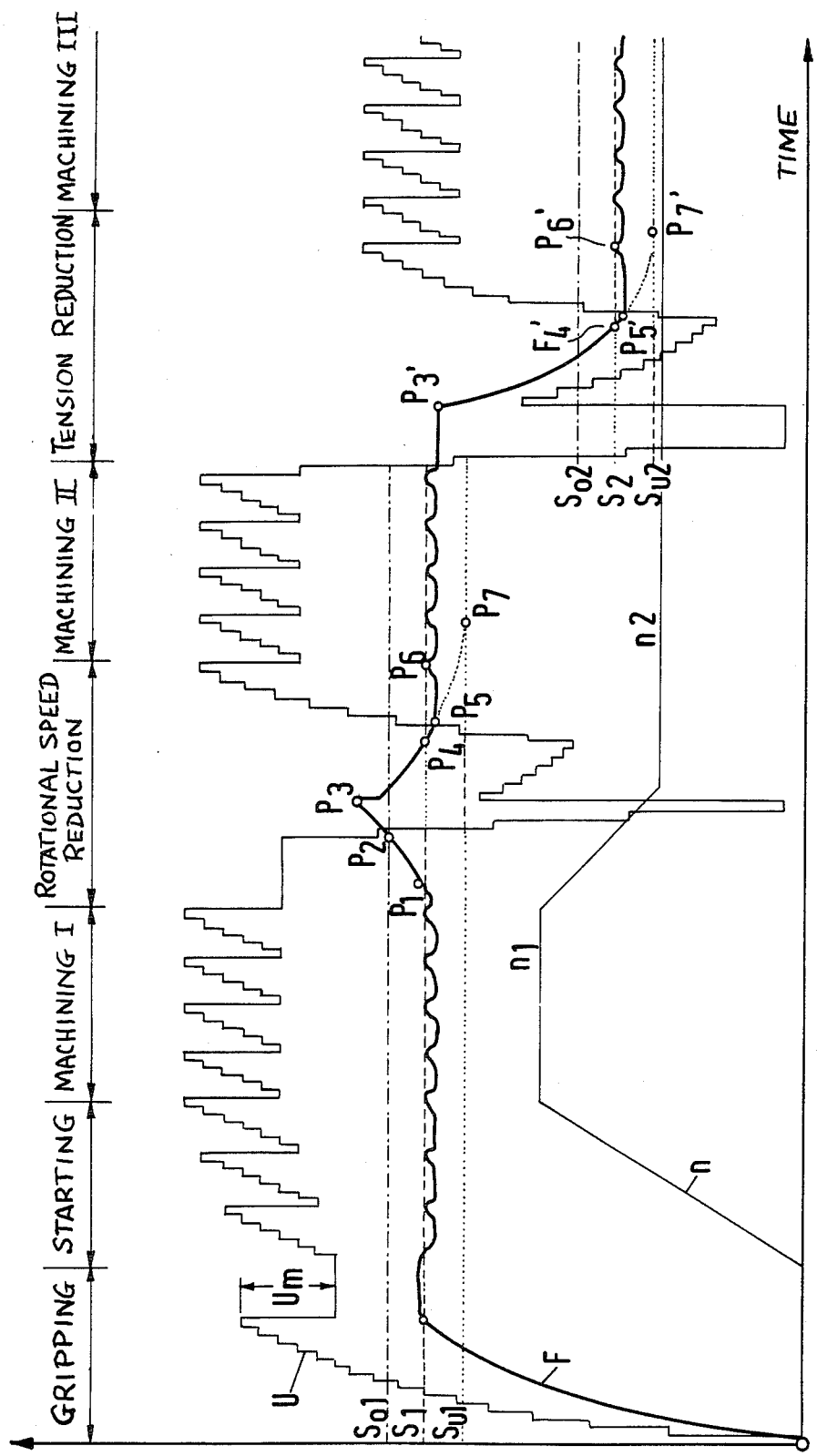

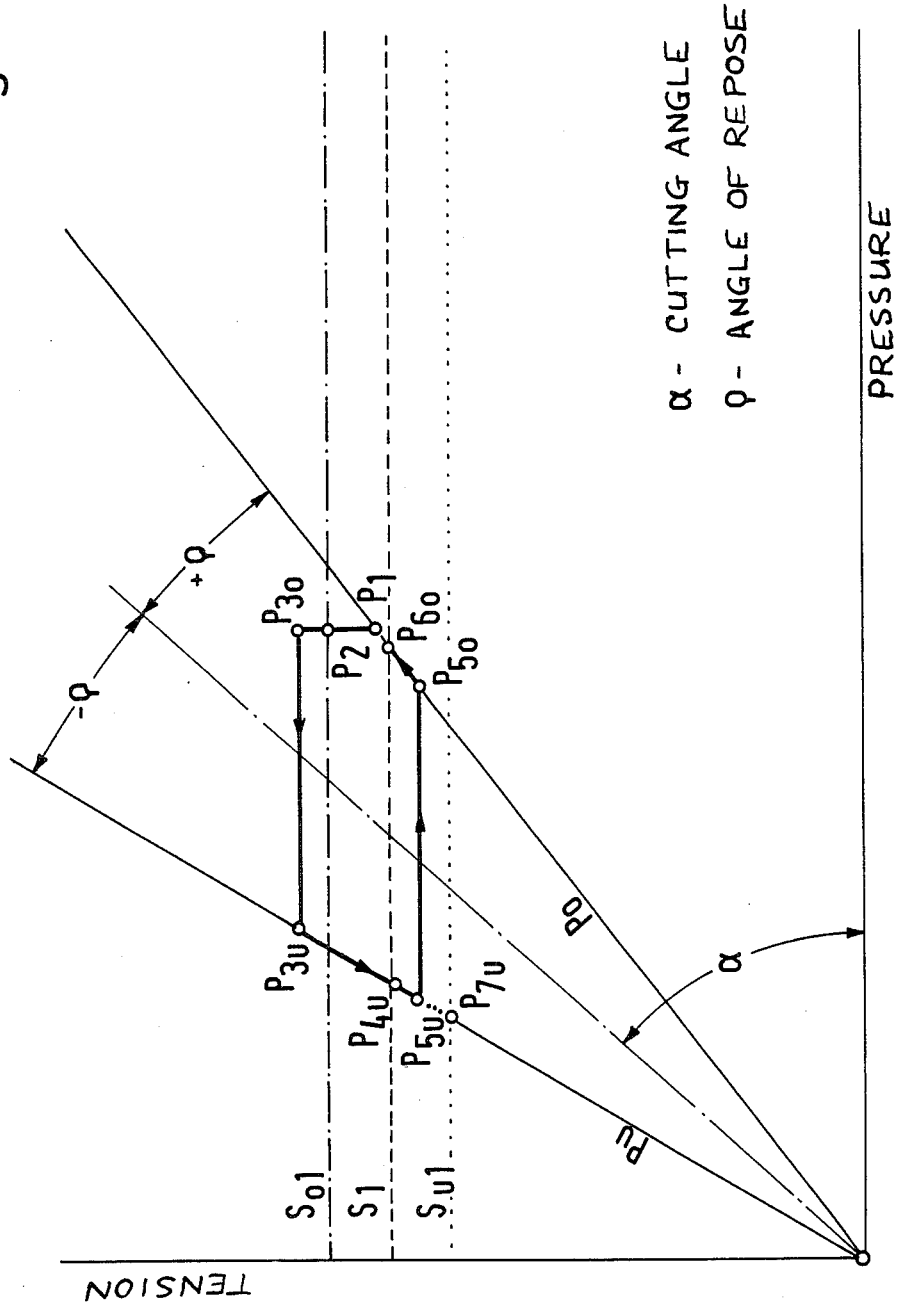

APPARATUS FOR THE ADJUSTMENT OF THE TENSION IN A ROTATING GRIPPING DEVICE OF A MACHINE TOOL

BACKGROUND OF THE INVENTION

1. Field of the Invention

The present invention relates to an apparatus for the adjustment of the tension or gripping force to a rotating gripping device of a machine tool having multiple gripping elements, operated by a tension producing means which is provided with a correcting element that varies power or tension output via gear elements, and which by the build up and withdrawal of the tension or gripping force follow (hysteresis) distinct characteristics. At least one of the measuring elements is disposed in the gripping device for the determination of the respective tensions or forces which are exerted on the workpiece by the gripping elements, whereby the measured values are transferable through a signal controller from the gripping device to the regulator.

2. Description of the Prior Art

Rising centrifugal forces influence the gripping or clamping elements of the rotating gripping devices with increasing rotational speeds, which provide tension or gripping force. In order to also secure a sufficient tension with high rotational speeds, there is already produced a so high tension during the standstill or nonoperational phase of the gripping element, so that there remains a sufficient balance on the gripping power despite the power reduction through the centrifugal force by the high rotational speed operation.

A magnification, such as this, of the tension or force in the standstill of the gripping device has the danger of undesired deformations of the workpiece which is held therein, especially when it concerns a very malleable workpiece, such as a thin-walled ring. With very malleable workpieces such as these, it is therefore frequently necessary to reduce the starting tension in the standstill of the chuck, whereby the danger exists that the tension with high rotational speed operations is lessened by an unduly large degree and leads to a high danger of an accident.

In order to eliminate the disadvantage of the known gripping devices, it has long been known to provide the chuck with counterbalances. Each gripping jaw is associated with the counterbalances over a compound lever arrangement and they adjust the centrifugal force in a known mass. Chucks of this type due to the supplementary counterbalances, therefore are not only complicated in construction, expensive to produce, subject to repair, and make use of, require or demand a comparatively large space, but they also have a different disadvantage, that the fixing equipment and the centrifugal force stress must be adapted one after another. The gripping jaws will be adapted to the respective workpiece by the modern machine tool, not allowing such centrifugal force compensating chucks to be universally used, because in practice a replacement of the counterbalance would be time consuming and expensive.

In order to eliminate this disadvantage, a power operated chuck is known from the German Pat. No. 2,150,885 Steinberger et al dated Sept. 20, 1973, corresponding to U.S. Pat. No. 3,815,929-Steinberger et al dated June 11, 1974. This reference discloses a tension or gripping force dependent upon the centrifugal force which results from the gripping elements of the chuck dependent upon the rotational speed, with this tension being controllable. The control takes place via an impulse transmitter which rotates proportional to the rotational speed of chuck, and which effects a change of pressure by means of a control unit.

The disadvantage of this known construction is that, by the changing of the pressure in the force producing means, neither the lubricating condition of the chuck nor the rigidity of the chuck and the respective workpiece will be taken into account. This limiting condition can influence the actual tension patterns so decidedly, that the amounts which are determined in advance vary considerably from the actual tension patterns, because not the actual tension patterns, but instead only the strength going into the chuck is altered. Due to the advanced improvements of the machining technology, the known construction is no longer adequate.

Moreover, from German Pat. No. 2,557,470 Steinberger et al dated July 7, 1983, a process to distinguish hydraulic cutting of the workpiece in power operated gripping devices is known. In these, the workpiece, which is being gripped, is subjected to a rough machining at a maximum tension and a finishing machining at a lesser tension. In this connection, the tension is produced by means of a pressure medium cylinder, is transmitted by a wedge surface to the tension elements, and, between the rough and the finishing machining, is lowered, without the taking out or unclamping of the workpiece, alone through the reduction of cut pressure in the pressure medium cylinder.

With such gripping tools, with which is transmitted a tension or gripping force, that is produced through a pressure medium activated cylinder, over wedge surfaces to the gripping elements, begins a type of automatic locking through the unavoidable jamming of the transfer elements as a result of deformations of the moved parts in addition to the frictional portion. This occurs whether, the cutting tools which are used in practice with a cutting motion, have a cutting angle which amounts to 15°–20° and is thereby greater than that with an angle of (internal) friction or angle of repose lying at approximately 6. With this lowering of the pressure from a higher pressure for the purpose of the performance of the rough machining to a lower pressure for the purpose of the finishing machining, the cutting strength which corresponds to a high pressure on the workpiece therefore remains operatively in the known chuck with the cutting motion despite the lowering of the pressure.

In order to eliminate this disadvantage, according to the known process, after the conclusion of the rough machining, the cut pressure in the cylinder is controlled under which the automatic locking of the movable gripping elements lowers the maintained value. The reduction of pressure therefore finishes over that for the cohesion of the required values, before joining the desired pressure built up for the finishing machining.

Also with this known process, the overcoming of the hysteresis of the cutting tool cannot be guaranteed despite the controlled lowering of the pressure, since the changes in the cut pressure in the pressure medium cylinder lead to corresponding reactions in the specific cutting tool. Difficulties especially are produced with a disregarding of the lubricating phase of the chuck and the rigidity of the workpiece and gripping device.

These difficulties which arise thereby, that, instead of influencing the cutting strength, the pressure in the tension producing means has been provided as a standard amount- should be eliminated with a power operated chuck according to the published European Patent Application No. 108,857 Rohm dated May 23, 1984. With this chuck, at least one tension receiver is constantly provided on the gripping jaws, i.e. also with a rotating spindle determining the respective cutting strengths, whereby the measured values will transmit over one sender rotating with the chuck and a stationary receiver and will eliminate the requirement to influence the axial strength producing means.

In addition to the constructive features and the possibility to change, with the help of these constructive features, the actual measured cutting strength with the tension receiver, published European Patent Application No. 108,857 Rohm dated May 23, 1984 contains no indication as to how an apparatus for the adjustment of tension is formed, in practice, to attain the desired influence of the tension or cutting strength, especially after the consideration of the foregoing peculiarities with gripping devices, such as friction and hysteresis. Because of these peculiarities, the known regulating systems, which assume a frictionless condition, are not practical.

An object of the present invention therefore is to provide an apparatus for the adjustment of tension on a rotating gripping device of the type previously described, which considers the peculiarities of the gripping elements, especially the occurrence of friction and hysteresis, and not only provides a stabilization of the tension independent of the respective rotational speeds, but also makes possible an alteration of the tension corresponding to the machining program of the machine tool and within a shorter time.

SUMMARY OF THE INVENTION

To provide a solution for these drawbacks, the invention is characterized primarily in that, a desired value for the tension and respectively an internal tolerance allotment for an upper and a lower desired regulating value will be presupposed in an electronic regulator, and an actual-desired value comparison will be regularly performed. The present invention is also characterized primarily in that, moreover, in the regulator for the changing of the power output of the tension producing means via the correcting element, one of the power outputs leading controller outputs can be digitally produced, whose jumps or intervals are large when there is a larger deviation of the actual (or determined) value from the desired value and small with smaller deviations and which, with the reaching of the desired value of the tension through the actual value, will be lessened to around a presupposed magnitude. This allows the actual value of the tension in presupposed regular intervals to fall below the desired value by means of the reduction of the controller output and to increase regularly again from below to the desired value. Thus, with an increase of the actual value of the tension to a presupposed value from the upper tolerance allotments, the controller output is lowered for the purpose of the lowering of the tension and the overcoming of the hysteresis so long as a lower allotment of the lower tolerance allotments is a new desired value until the actual value of the tension has fallen to a value between the respective desired value and the lower desired value allotment. After this, the controller output again is raised until it reaches the desired value through the actual value and is regularly lowered by means of the reduction of the controller output.

With the inventive apparatus, for the respective workpieces the tension is presupposed which is necessary for the first machining operation. For this purpose, the tension producing means works until the power output of the strength reaches the presupposed desired value of the tension. Accordingly, it is no longer strived to be a theoretically corresponding desired value of the desired tension, for example, of the pressure in the tension producing means but instead is an actual tension value.

With the contact of the gripping device whose gripping elements are subjected to the centrifugal force, whereby the tension would reduce itself, the apparatus effects an increase of the strength exercised from the tension producing means on the gripping device in order to balance it by means of the centrifugal force produced tension loss. In order to hereby prevent an excess of the tension-desired value, there is also digitally produced—in the same manner as with the build up of tension during standstill—a leading controller output of the power output, whose jumps are larger with larger variations of the actual value from the desired value and smaller with smaller deviations, so that a fast adjustment is attained despite the elimination of the excess. An excess of the desired value, as it is known in the usual regulating systems, as a result of the automatic locking of the gripping device, leads to a retaining of the exceeded tension value. According to the invention, with the reaching of the desired value of tension by means of the actual value, the controller output is lessened regularly to a presupposed magnitude and the actual value of the tension is lowered regularly by means of the reduction of the controller output below the desired value. Thus, the actual value of the tension, constantly within the presupposed tolerances and independent from the rotational speed, is adjusted from below to the desired value.

With the increase of the acutal value of the tension, especially via lowering of the rotational speed and with it the reduction of the centrifugal force, the controller output lowers to a presupposed value of the upper tolerance allotments, for the purpose of lowering the tension and overcoming the hysteresis according to the invention; this lowering occurs as long as the lower allotment of the lower tolerance allotment as a new theoretical or nominal value until the actual value of the tension has fallen to a value between the respective desired value and the lower desired value allotment. The automatic locking or self-restraints (hysteresis) is overcome hereby. It is possible, accordingly, with the inventive device to hold the actual tension constant also with a rotational speed decrease, which would be lead to an increase in tension as a result of the decreasing centrifugal force, and especially to lower the tension for the execution of a further machining task aimed at a new, lower value.

According to the invention, it is possible for the first time to adjust the actual tension for gripping a specific workpiece in each instance for an optimum tension for the respective machining tasks and to fit these desired values in the program of the machine tool, from which they will then timely call for the changing of the desired value for the gripping device.

BRIEF DESCRIPTION OF THE DRAWINGS

This object, and other objects and advantages of the present invention, will appear more clearly from the following specification in conjunction with the accompanying drawings, in which:

FIG. 2 is a view that shows a chart of the work cycle of a tensioning process; and FIG. 3 is a view providing a further chart which shows the interrelation, according to the present invention, between the tension and the axial force with a decrease of the tension.

DESCRIPTION OF PREFERRED EMBODIMENTS

Figure 1:
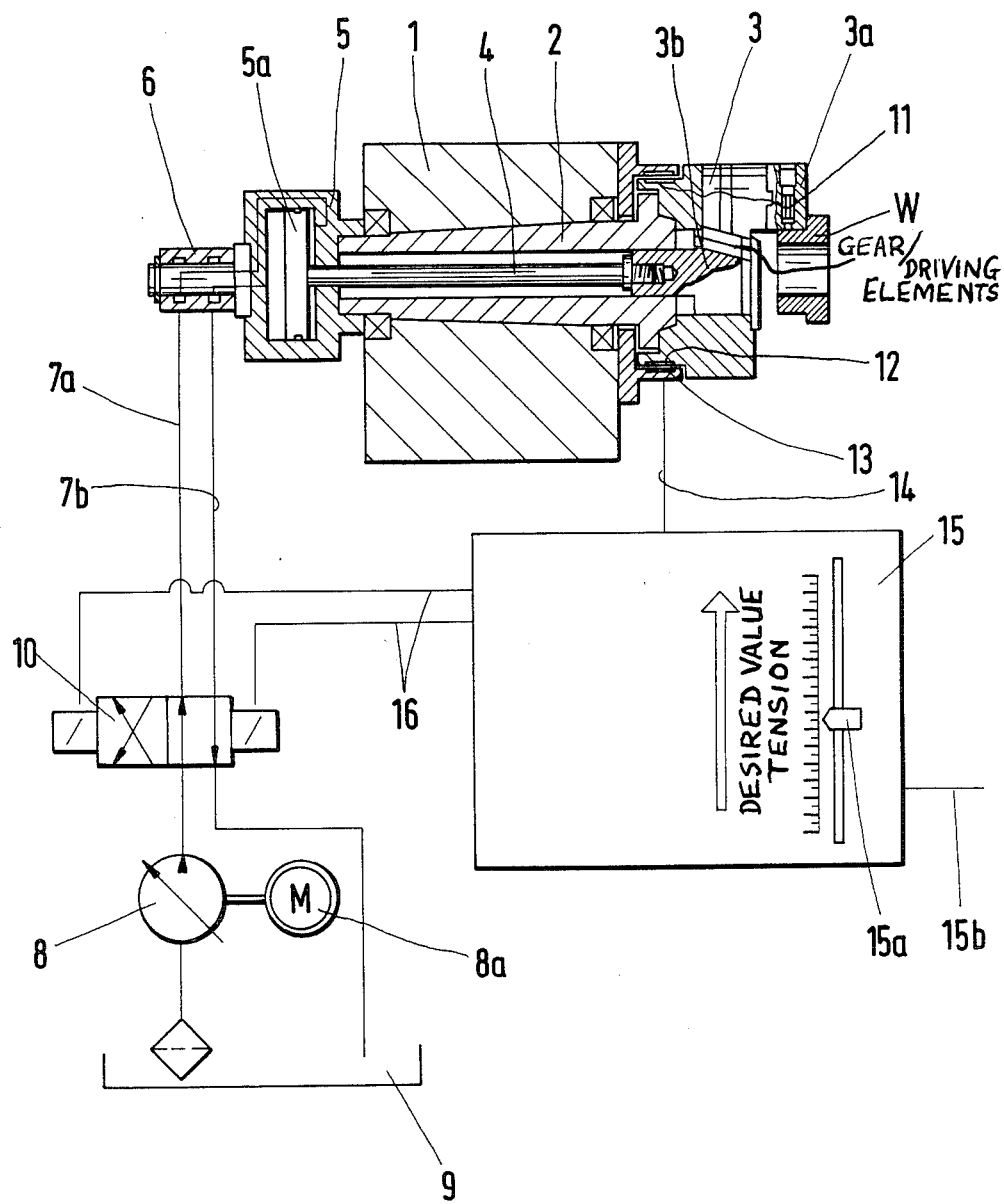
FIG. 1 is a view that shows a schematic illustration of a gripping device, disposed on a spindle of a machine tool having an apparatus according to the present invention for the adjustment of the tension.

Referring now to the drawings in detail, FIG. 1 shows a pivoted spindle 2 in a spindle housing 1 of a machine tool, which is non-illustrated. A chuck 3 is disposed on the front flange of the spindle 2. The gripping jaws or chuck jaws 3a of the chuck 3 are operated in a radial direction by the chuck plunger 3b which cooperates, by way of the inclined wedge surfaces, with the gripping jaws 3a. The chuck plunger 3b is connected via a rod 4 with the piston 5a of a tension or force producing means 5, which is shown as a pressure medium cylinder in this embodiment. However, the tension producing means 5 can also be constructed as an electromechanical tension producer. The pressure medium or means for the tension producing means 5 is supplied via a pressure medium transfer housing 6, which is connected via two pressure medium controllers or guides 7a, 7b to a pressure medium supply container 9 or to a pump 8 which is driven by a motor 8a.

For the gripping of the workpiece W, which is illustrated in FIG. 1, the rod-side surface of the piston 5a of the tension producing means 5 is acted upon by the pressure medium or means, while a servo valve 10 or correcting element in the two pressure medium lines 7a and 7b is correspondingly controlled and this side of the piston 5a connects with the pump 8. For the release of the finished machining workpiece 12, this servo valve 10 is reversed, so that in this case the opposite surge or pressure chamber is connected to the pump 8.

The servo valve 10 also acts to alter the pressure in the pressure chamber of the tension producing means 5 serving for the production of the tension, in order to obtain the desired tension in each case. The desired tension or force is then exerted on the workpiece W by means of the gripping jaws 3a of the chuck 3. For the determination of this respective tension, the chuck 3 is equipped with a measuring element 11, whose instrument leads or run measuring lines to a sender 12 which lead is disposed in the chuck body. From this sender 12, the measured values are transmitted, without contact, to a stationary receiver 13, which is connected via a signal line 14 with an electronic regulator 15. This regulator 15 is connected via control mechanisms 16 with the servo valve 10.

Contained within the regulator 15 is a desired valve adjuster 15a, by means of which the desired tension adjusted appropriately for the respective machining tasks. The desired valve adjuster 15a is operated preferably internally by a program of the machine tool, as was indicated by the lead wire 15b.

The processes for the adjustment of the tension or the rotary chuck 3, according to the embodiment illustrated in FIG. 1, will be described below with the help of FIGS. 2 and 3.

The diagram, which is illustrated in FIG. 2, shows the per unit time of the work cycle or transient operating sequence of the tension of gripping force F, the rotational speed n, and a controller output U, which pertains, to the gripping and machining of a workpiece W. The timed work cycle or transient operating sequence includes the gripping of the workpiece, the starting of the machine tool, a first machining operation, a lowering of the rotational speed, a second machining operation at a reduced rotational speed, a lowering of the tension by a constant rotational speed, and a third machining of the workpiece at this lowered rotational speed.

To grip the workpiece W in the gripping jaws 3a of the not rotating chuck 3, there will be presupposed a desired value $S_1$ for the tension or gripping force F. The desired value $S_1$ corresponds to the holding force for the first machining task, without which the tension loss as a result of the centrifugal force must be taken into account. The desired value $S_1$ is represented by broken lines in FIG. 2. Internal tolerance allotments for the upper desired regulating value $S_{o1}$ and for the lower desired regulating value $S_{u1}$ are assigned to this desired value $S_1$. These are represented respectively by the dash-dot lines and dotted lines in FIG. 2.

The regulator or control apparatus 15 distributes or delivers the leading controller output or regulated quantity (servo) U and at the same time monitors, by means of the measuring element 11, the difference between the desired and the actual value of the measured tension or gripping force F. The alteration of the controller output U results from jumps, which are large in connection with the larger deviation of the actual value from the desired value and are small in connection with a small deviation, as is illustrated in one diagram in FIG. 2.

With the help of leading controller output U, the gripping force F will be increased less and less during the standstill of the chuck 3 until the desired value $S_1$ is reached. By reaching the desired value $S_1$, the controller output U lessens to a presupposed magnitude $U_m$, which is also represented in the diagram in FIG. 2. In this way, an insignificant lowering of the gripping force F takes place. However, the gripping force F remains continually above the lower desired regulating value $S_{u1}$.

Consequently, the desired value $S_1$ of the tension or gripping force F has been reached; at this time the spindle 2 can be displaced with the chuck 3 in rotation. During the following running in the tension or gripping process (see FIG. 2), the rotational speed n increases until the presupposed rotational speed n1 for the first machining process is reached. During this starting process, a lessening of the tension F, which is measured by the measuring element 11, is produced as a result of the centrifugal force working on the gripping jaws 3a. Accordingly, regulator 15 gives instruction to the servo valve 10 by means of the control mechanism 16 to increase the pressure for the tension producing means 5 until the desired value $S_1$, is again reached. The increase of pressure takes place in turn with the help of the controller output or regulated quantity (servo) U, which is lessened in each instance by the desired value $S_1$ reaching the magnitude Um, thereby preventing an overreaching of the desired value $S_1$ of the tension F. On the basis of the preceding adjustment, the tension F remains within the tolerance range despite the increasing rotational speed n.

In this manner, the conditions for the beginning of the first machining process are created. Also, during this machining, the tension F is continuously controlled, whereby the actual value of the tension F in the presupposed intervals lessens regularly through the controller output or regulated quantity (servo) reduction Um under the desired value $S_1$ and is regularly increased again from under to this desired value $S_1$.

In the machining example shown in FIG. 2, the rotational speed n for the second machining process should be lowered, whereby this second machining process therefore should be performed with the same tension F. Accordingly, at the end of the first machining task, a lowering of the rotational speed n from the value nl to the value n2 takes place. During this lowering of the rotational speed, the influence of the centrifugal force on the gripping jaws 3a diminshes, so that the tension F begins to climb from point p1 to point p2. Correspondingly, the controller output or regulated quantity (servo) U is lowered in large jumps of intervals by the regulator 15. Nevertheless, the tension F increases temporarily to point P3. In order to lower the tension from this value to the point P4, which corresponds to the desired value $S_1$, the automatic locking or self restraint (hysteresis) of the chuck 3 must be overcome in accordance with the diagram in FIG. 3.

FIG. 3 shows the course of the tension or gripping force as being dependent on the pressure in connection with the lowering of the rotational speed, whereby the corresponding points of the diagram according to FIG. 2 are recorded in the diagram of FIG. 3. It should be noted, that, through the lowering of the rotational speed, the tension is increased by an unchanging pressure from P1 over P2 to the value $P_{30}$. The rapid lowering of the controller output or regulated quantity (servo) U certainly decreases the pressure from $P_{30}$ to $P_{34}$, however, without a reduction of the tension being attained in this way, because the chuck 3 does not release itself as a result of the automatic locking or self restraint (hysteresis). A release first occurs then when the pressure is further reduced, whereby the reduction corresponds to the pressure path pu. Corresponding to this line, the tension F sinks from point $P_3u$ over the value $P_4u$ to the value $P_5u$, which already lies under the desired value $S_1$. In order to accelerate this lowering of the pressure, for the lowering process, the desired value $S_1$ for the tension F is reduced to the lower desired regulating value $S_{u1}$. This reduction of the desired value could have followed the result of the point P7 which is illustrated in FIG. 2.

However, the lowering of the pressure is interrupted by the regulator 15 as soon as the measuring element 11 detects a falling below of the desired value $S_1$ at the point P5. Accordingly, an increase of the pressure (see the diagram in FIG. 3) from $P_{5u}$ to $P_{50}$ already takes place at this point. This pressure, which is necessary to the increase of the tension F, lies on the pressure path po. With the help of the controller output or regulated quantity (servo) U, the tension F is again now raised to the desired value $S_1$ (see point $P_{60}$ in the diagram of FIG. 3 corresponding to P6 in the diagram of FIG. 2).

In this way, the conditions for the second machining process are created. This second machining process takes place with a rotational speed n2 and an equal tension F corresponding to the desired value $S_1$. Also during this machining process the pressure in the tension producing means is regularly reduced by the controller output or regulated quantity (servo) U to around the value Um and approaches from under here again to the desired value $S_1$, as is shown in FIG. 2.

In the machining example according to FIG. 2, the workpiece W should now be machined with a lowered tension F. Thus, a lowering of the tension is joined to the second machining process. For this reason, a new desired value $S_2$ is presupposed to the regulator 15, which again has a higher desired regulating value $S_{o2}$ and a lower desired regulating value $S_{u2}$ assigned to it. With regard to their internal tolerance allotments, these values can deviate from the tolerance allotment of the first desired value $S_1$.

On the basis of the reduction of the desired value $S_2$, the pressure in the tension producing means is lowered with the help of the controller output U or regulated quantity (servo). The tension F falls from P3' over P4' to P5', whereby during the lowering of the tension, the lower desired regulating value $S_{u2}$ is presupposed as the desired value for a short time. It is hereby attained, that the lowering of the tension during the rotating of the chuck 3 is achieved with the rotational speed n2. In this connection, the overcoming of the automatic locking or self restraint (hysteresis) takes place according to the explanation by the lowering of the rotational speed according to the diagram in FIG. 3. The points P3' to P6' correspond to the points P3 to P6 in FIG. 3.

As soon as the point P5' in FIG. 2 is reached, the regulator 15 recognizes a falling short of the desired value $S_2$. Accordingly, a boost of the pressure, and thereby of the tension F, over the controller output or regulated quantity (servo) U takes place. It repeats itself corresponding to the process, as with the first machining process, whereby the third machining process nevertheless takes place with the rotational speed n2 by a tension F with the desired value $S_2$.

From the foregoing explanation it can be seen that, with the described apparatus, the tension can be adjusted to a desired value for the respective machining tasks on short notice and within a very small tolerance; and, the values are independent thereof, whether the chuck 3 is at a standstill or is revolving relatively independently from the respective rotational speed n of the chuck 3.

The present invention is, or course, in no way restricted to the specific disclosure of the specification and drawings, but also encompasses any modifications within the scope of the appended claims.

What we claim is:

1. An apparatus for the adjustment of the tension of a rotating gripping device of a machine tool having a plurality of gripping elements operated by a tension producing means, with said tension producing means having a correcting element that varies tension applied via drive elements, and whereby a build up and a withdrawal of tension applied can follow distinct prescribed characteristics, with at least one measuring element being disposed in said gripping device and acting to ascertain determined values of the tensions applied directly when actually exerted by said gripping elements on a workpiece which is gripped by said gripping device, and with said determined values being transferable through a signal controller from said gripping device to a regulator for continuous and correct controlled regulation of the tension applied so that at every time the actual value of tension corresponds objectively correct as to intended rated value with an internal tolerance within allowable variation thereof, which comprises:

means to provide a desired value for said tension applied which is presupposed in said regulator, with said regulator being electronic;

means to establish at least one upper regulating desired value;

further means to establish at least one lower regulating desired value;

means to define an internal tolerance allotment which is the amount by which said upper and said lower regulating values may differ from said desired value;

means for carrying out of a continual comparison between said desired value and said determined values; and means to provide a leading controller output which is digitally produced in said regulator to change the tension applied by said tension producing means through the action of said correcting element, with said controller output being produced in intervals which are of greater amount when there is a larger difference between said determined value and said desired value and of smaller amount when there is a smaller difference between said determined value and said desired value, and with said controller output being reduced to a presupposed magnitude when said desired value of said tension applied is reached through said determined value, whereby said determined value of said tension applied correspondingly falls below said desired value through said reduction of said controller output and correspondingly increases from below said desired value to said desired value, and whereby with an increase of said determined value of said tension applied to a presupposed value from an upper tolerance allotment, said controller output is decreased to lower said tension applied so long as a lower allotment of said lower desired value is a new desired value until said determined value of said tension applied reaches a value between the respective said desired value and a lower desired value allotment, after which point, said controller output is increased again until it reaches said desired value through said determined value and is regularly lowered through said reduction of said controller output.

2. In a method for the adjustment of the tension of a rotating gripping device of a machine tool having a plurality of gripping elements operated by a tension producing means, with said tension producing means having a correcting element that varies tension applied via drive elements, and whereby a build up and a withdrawal of tension applied can follow distinct prescribed characteristics, with at least one measuring element being disposed in said gripping device and acting to ascertain determined values of the tensions applied directly when actually exerted by said gripping elements on a workpiece which is gripped by said gripping device, and with said determined values being transferable through a signal controller from said gripping device to a regulator for continuous and correct controlled regulation of the tension applied so that at every time the actual value of tension corresponds objectively correct as to the intended rated value with an internal tolerance within allowable variation thereof, the steps therewith which comprise:

providing a desired value for said tension applied which is presupposed in said regulator, with said regulator being electronic;

establishing at least one upper regulating desired value;

also establishing at least one lower regulating desired value;

defining an internal tolerance allotment which is the amount by which said upper and said lower regulating values may differ from said desired value;

carrying out a continual comparison between said desired value and said determined values; and operating via a leading controller output which is digitally produced in said regulator for changing the tension applied by said tension producing means through the action of said correcting element, with said controller output being produced in intervals which are of greater amount when there is a larger difference between said determined value and said desired value and of smaller amount when there is a smaller difference between said determined value and said desired value, and with said controller output being reduced to a presupposed magnitude when said desired value of said tension applied is reached through said determined value, whereby said determined value of said tension applied correspondingly falls below said desired value through said reduction of said controller output and correspondingly increases from below said desired value to said desired value, and whereby with an increase of said determined value of said tension applied to a presupposed value from an upper tolerance allotment, said controller output is decreased to lower said tension applied so long as a lower allotment of said lower desired value is a new desired value until said determined value of said tension applied reaches a value between the respective said desired value and a lower desired value allotment, after which point, said controller output is increased again until it reaches said desired value through said determined value and is regularly lowered through said reduction of said controller output.

* * * * *